United States Patent [19]
Karpov et al.

[11] 4,047,428
[45] Sept. 13, 1977

[54] FORCE MEASURING TRANSDUCER WITH FREQUENCY OUTPUT SIGNAL

[76] Inventors: Valentin Mikhailovich Karpov, Kolomensky prospekt, 7, korpus 1, kv. 50; Vladimir Rezhevich Santo, Varshavskoe shosse, 10, kv. 137; Viktor Yakovlevich Yanovsky, Kostanaevskaya, 23, korpus 2, kv. 14; Anatoly Ivanovich Mikhailov, ulitsa Obrucheva, 28, korpus 2, kv. 154; Mikhail Fedorovich Belyaev, prospekt Vernadskogo, 68, kv. 12, all of Moscow, U.S.S.R.

[21] Appl. No.: 625,514

[22] Filed: Oct. 24, 1975

[51] Int. Cl.² ............................................. G01L 1/10
[52] U.S. Cl. .............................. 73/141 A; 73/DIG. 1
[58] Field of Search ........ 73/141 A, 517 AV, DIG. 1

[56] References Cited
U.S. PATENT DOCUMENTS

| 3,332,506 | 7/1967 | Bradfield | 73/141 A X |
| 3,470,400 | 9/1969 | Weisbord | 73/DIG. 1 |

*Primary Examiner*—James J. Gill

[57] ABSTRACT

The proposed force measuring transducer with a frequency output signal comprises an elastic body arranged in a casing in spaced relationship with said casing. The elastic body, which is subjected to the action of a force, has a base and a working member. The base is secured in the casing with the aid of at least three supports. One end of each support is tapered and bears up against the surface of the base, whereas the other end of each support is joined to the casing. The working member is connected to an oscillating element whose oscillation frequency is dependent upon the action of the force. The oscillating member is the resonator of an electromechanical self-excited oscillator.

6 Claims, 2 Drawing Figures

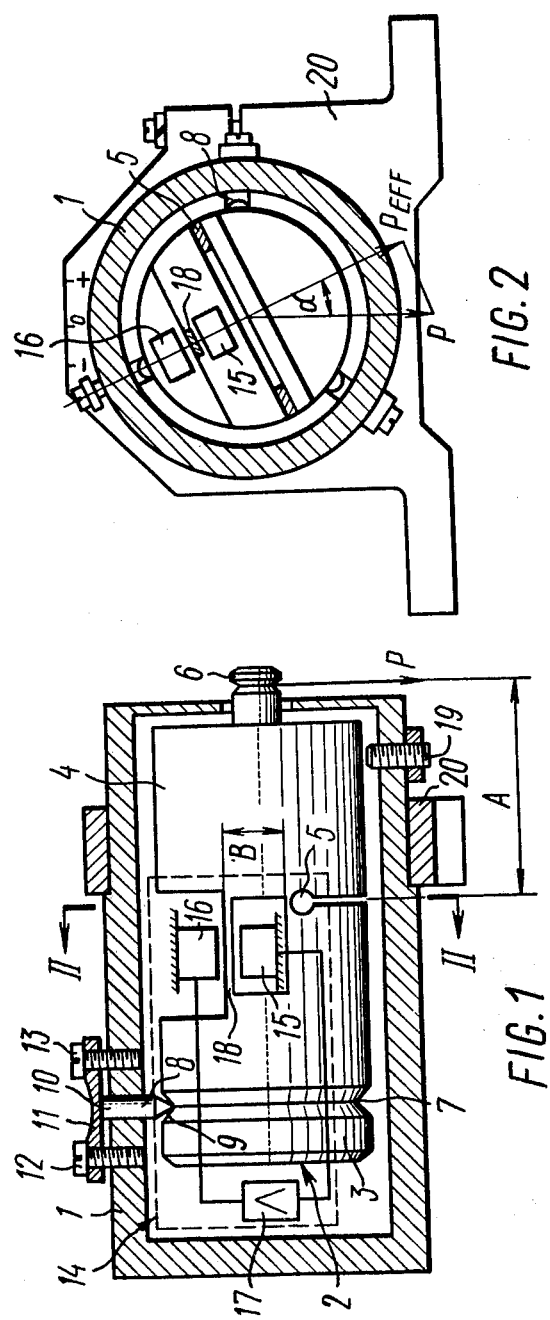

FORCE MEASURING TRANSDUCER WITH FREQUENCY OUTPUT SIGNAL

The present invention relates to force measuring transducers and, more particularly, to a force measuring transducer with a frequency output signal.

The invention is applicable, for example, in precision weighers to convert the force of gravity into a frequency-modulated output signal.

Extensively used at present are force measuring transducers with sensitive elements in the form of oscillating bodies, such as strings, rods and diaphragms. The oscillation frequency of these sensitive elements depends upon their geometrical dimensions, physical properties of the materials they are made of, as well as loads or forces applied thereto.

Oscillations in these transducers are excited with the aid of a self-excited oscillator whose resonator function is performed by the aforementioned oscillating element which is subjected to the action of a load or force.

A high Q factor of mechanical resonators, which accounts for the frequency stability of the master oscillator, ensures high conversion accuracy. The latter, in combination with today's electronic-discrete frequency measuring techniques, accounts for high metrological characteristics of such transducers.

Of all the above-mentioned types of transducers, the most wide-spread is the one with a resonator made in the form of tightened strings. Apart from this type of resonators, the Soviet Union has developed and is currently using resonators constructed in the form of prismatic rods. The lateral stiffness of such rods ensures their stable oscillation without any pretensioning. In this respect such resonators are advantageous over those made in the form of strings, for the latter require pretensioning whose degree changes with time and leads to errors in measurements.

Transducers of the latter type, wherein use is made of a rod resonator, include, for example, a measuring force transducer with a frequency output signal. This transducer comprises a flexible body in the form of a cantilever beam, arranged in a casing. The cantilever beam has a base and a working member. The base is provided with a flange to mount the the transducer on a supporting surface. The working portion of the cantilever beam, which is subject to the action of a force, is connected to an oscillating element which is a resonator of an electromechanical self-excited oscillator and has an oscillation frequency depending upon the magnitude of the force applied to the transducer. The function of the oscillating element is performed by a prismatic rod constructed as a single whole with said cantilever beam. Apart from the resonator, the self-excited oscillator includes two polarized electromagnets arranged on both sides of the prismatic rod. One of said polarized electromagnets is a pickup. It is connected to an input of an amplifier and serves to convert mechanical vibration of the resonator into electric voltage oscillation. The second polarized electromagnet is an exciter. It is connected to an output of the amplifier and serves to convert electric current oscillation into an electromagnetic force to oscillate the resonator.

The casing of the transducer houses the elastic cantilever beam and protects the transducer from the effects of external factors. The casing is tightly fitted over and secured to the base of the cantilever beam and is in spaced relationship with the working portion thereof. The base of the beam is in contact over the entire surface of the flange with the supporting surface and is at the same time in contact with the casing.

As the transducer is subjected to certain loads, the vibrations of the prismatic rod are accompanied by resonance oscillations of the whole of the flexible cantilever beam or of its elements. In the zones where the cantilever beam's base is in contact with the casing and the supporting surface, these oscillations are marked by considerable attenuation, which disturbs the oscillatory mode of the resonator and distorts the output characteristic of the transducer, which is a relationship between the resonator frequency and the force applied to the transducer. The result is inferior measurement accuracy.

The transducer under review is mounted on the supporting surface of being bolted to the flange of the cantilever beam. If the bolts are tightened too firmly, or, on the contrary, if the tightening is too weak, this may lead to disturbances in the self-excited oscillation behaviour of the resonator, which, in turn, also leads to errors in measuring forces.

It is an object of the present invention to raise the accuracy of measuring forces by providing a force measuring transducer with a frequency output signal.

The foregoing and other objects of the present invention are attained by providing a force measuring transducer with a frequency output signal, comprising an elastic body arranged in a casing, the base of said body being secured in said casing, whereas the working member of said elastic body, which is subject to the action of a force, is connected to an oscillating element which is a resonator of an electromechanical master oscillator and has an oscillation frequency depending upon the magnitude of a force applied to the transducer, in which transducer the elastic body is arranged in said casing, according to the invention, in spaced relationship with said casing, whereas the base of said elastic body is secured with the aid of at least three supports, each having a tapered end bearing up against the surface of the base, the other end of each of said supports being joined to the casing.

It is expedient that triangle-shaped grooves be provided on the base surface of said elastic body to receive the tapered ends of the supports. The angle between the walls of said grooves must be greater than the taper angle of the ends of said supports.

It is also expedient that in the force measuring transducer of the present invention the end of at least one of the supports be coupled to the casing through a spring whose force is directed along this support, the ends of the other supports being rigidly fixed to the casing.

The proposed transducer ensures a higher accuracy of measurements, as compared to the known types of transducers, which is due to the aforesaid manner of positioning and securing the elastic body in the transducer casing. The elastic body is secured in the casing with the aid of three supports, so that the surfaces of contact between the supports and the elastic body are localized at three points having small contact areas, which substantially reduces the degree of attenuation of the elastic body's oscillations. Thus, there is no disturbance in the self-excited oscillation behaviour of the resonator, which otherwise might affect the accuracy of measurements. In addition, the coupling of one of the supports to the casing through a spring accounts for a constant force with which the elastic body is secured in the casing.

The spaced relationship between the elastic body and the casing excludes any contact between said elastic body and the walls of the casing, which also reduces the degree of attenuation of the elastic body's oscillations and raises the force measuring accuracy.

Other objects and advantages of the present invention will become more apparent from the following detailed description of a preferred embodiment thereof taken in conjunction with the accompanying drawings, wherein:

FIG. 1 is an elevation view of a force measuring transducer with a frequency output signal in accordance with the invention;

FIG. 2 is a section taken along the line II—II, turned by an angle α.

Referring now to the attached drawings, the proposed force measuring transducer with a frequency output signal comprises an elastic body arranged in a casing 1 (FIG. 1) in spaced relationship with said casing 1. The casing 1 is cylinder-shaped. The elastic body is constructed as a cantilever beam 2 having a base 3 and a working member 4 which are interconnected by means of flexible joints 5. The working member 4 of the cantilever beam 2 is a bell-crank lever intended to be subjected to the action of a force P. Said working member 4 is provided with a force-sensitive head 6 having a triangle-shaped groove. The distance between the axis of the joints 5 and the groove on the head 6, designated A, determines the length of the greater arm of the lever. B is the length of the shorter arm of the lever.

The presence of the flexible joints 5 that couple the working member 4 to the base 3, accounts for a smooth output characteristic of the proposed transducer and raises the force measuring accuracy.

The base 3 of the cantilever beam 2 is secured in the casing 1. For this purpose, on the surface of the base, along its perimeter, there is made a triangle-shaped annular groove 7. Spaced circumferentially, over each 120° of arc, in the casing 1 are three supports 8 (FIG. 2). Each support 8 has one tapered end 9 (FIG. 1) and a second end 10. The tapered ends 9 are shaped as trihedral prisms or as cones. The tapered ends 9 of the supports 8 bear up against the annular groove 7. The angle between the walls of the triangle-shaped groove 7 is greater than the taper angle of the ends 9 of the supports 8. This makes for a point contact between the supports 8 and the surface of the base 3, which sharply reduces the degree of attenuation of oscillations of the cantilever beam 2 and, consequently, raises the accuracy of measuring forces.

The ends 10 of the supports 8 are secured to the casing 1. The ends 10 of two supports 8 are rigidly secured to the casing 1, whereas the end 10 of the third support 8 is coupled to the casing 1 by means of a flat spring 11 whose force is directed along said third support 8. The spring 11 is bolted to the casing 1 with bolts 12 and 13. The spring 11 accounts for a constant stress with which the cantilever beam 2 is secured in the casing 1.

The force measuring transducer of the present invention further includes an electromechanical master oscillator 14. The latter comprises a resonator, two polarized magnets 15 and 16, and an amplifier 17.

The resonator is a prismatic rod 18 having certain flexural rigidity. One end of the rod 18 is coupled to the shorter arm B of the bell-crank lever, its other end being coupled to the base 3 of the cantilever beam 2. The rod 18 is made as a single whole with the cantilever beam 2 and is part thereof. The oscillation frequency of the resonator is dependent upon the force applied to the force-sensitive head 6 of the working member 4.

The polarized electromagnets 15 and 16 are arranged on both sides of the resonator. The electromagnet 15 is a pickup and is connected to an input of the amplifier 17. Said electromagnet 15 serves to convert the mechanical vibrations of the resonator into electric voltage oscillations. The second electromagnet 16 is an exciter. It is connected to an output of the amplifier 17 and serves to convert electric current oscillations into an electromagnetic force to oscillate the resonator.

The amplifier 17 has the conventional circuitry and operates as an amplitude limiter. The transducer's output signal is taken off the amplifier 17 through additional cascade incorporated therein.

For load limiting purposes, a screw 19 is screwed into the casing 1. The screw 19 is locked in a position so that in case of an overload the greater arm A of the lever should bear up against the end face of the screw 19.

The casing 1 of the proposed transducer is secured in a supporting bracket 20 so that the axis of the flexible joints 5 is inclined with respect to the horizontal plane by an angle α (FIG. 2). The bracket 20 allows the transducer to be turned therein so that the sensitivity at a rated load should correspond to the required value. On the bracket 20 there are graduation marks and signs (+) and (−); on the casing 1 there are marks to indicate the direction in which the transducer is to be turned for greater or lesser sensitivity. The bracket 20 is provided with caps (not shown) by means of which the transducer is mounted on a supporting surface (not shown).

The foregoing design of the bracket 20 makes it possible to adjust the sensitivity of the transducer, for the effective force $P_{eff}$, which determines the sensitivity magnitude of the transducer, is the component of the force P being measured, perpendicular to the axis of the flexible joints 5 and equal to: $P_{eff} = P \cdot \cos \alpha$, where α is the adjustable inclination angle of the axis of the flexible joints 5 to the horizontal plane.

The proposed force measuring transducer with a frequency output signal operates as follows.

As the electromechanical self-excited oscillator 14 (FIG. 1) is switched on, the electromagnet 16, which is an exciter, converts the electric current oscillations into an electromagnetic force to oscillate the resonator. The mechanical vibrations of the resonator thus produced are converted by the electromagnet 15, which is a pickup, into electric voltage oscillations. Thus the self-oscillating conditions of the resonator are ensured.

As the force P being measured acts upon the greater arm A of the bell-crank lever, there are produced longitudinal stresses in the prismatic rod 18 which is the resonator. These stresses alter the lateral stiffness of the rod 18 and, consequently, its oscillation frequency. The degree of the change in the oscillation frequency of the resonator is indicative of the magnitude of the force P being measured. The output signal, which carries information of a change in the oscillation frequency of the resonator, is taken off the amplifier 17 and applied to a frequency meter (not shown).

What is claimed is:

1. A force measuring transducer with a frequency output signal, comprising: a casing; an elastic body responsive to bending forces arranged in said casing in spaced relationship therewith; a base on said elastic body and secured in said casing; a working member on said elastic body rigidly attached to said base and subjected to the action of a force; an oscillating element constructed as a single unit with said working member and having an oscillation frequency depending upon the magnitude of said force; an electromechanical self-excited oscillator with resonator comprising said oscillating element; at least three supports to secure said base to said casing and to limit the transfer of oscillatory energy from the elastic body to the other elements of the transducer; one tapered end of each said support bearing up against the surface of said base; the other end of each said support being joined to said casing.

2. A force measuring transducers claimed in claim 1, including triangle-shaped grooves on the surface of said base for contact between said tapered ends of said supports and said base; walls on each said groove; the angle between said walls on each said groove being greater than the taper angle of each said tapered end of each said support.

3. A force measuring transducer as claimed in claim 1, including a spring for coupling said end of at least one of said supports to said casing, the force of said spring being directed along said support.

4. A force measuring transducer with a frequency output signal, comprising: a casing; an elastic body in the form of a cantilever beam responsive to bending forces and arranged in said casing in spaced relationship therewith; a base on said elastic body and secured in said casing; a working member on said elastic body attached to said base by flexible joint and subjected to the action of a force; an oscillating element constructed as a single unit with said working member and having an oscillation frequency depending upon the magnitude of said force; an electromechanical self-excited oscillator with resonator comprising said oscillating element; at least three supports to secure said base of said elastic body in said casing and to limit the transfer of oscillatory energy from the elastic body to the other elements of the transducer; one tapered end of each said support bearing up against the surface of said base; the other end of each said support being joined to said casing, said working member including said cantilever beam for changing the stresses in said oscillating element in response to the action of said force.

5. A force measuring transducer as claimed in claim 4, including triangle-shaped grooves on the surface of said base for contact between said tapered ends of said supports and said base; walls on each said groove; the angle between said walls on each said groove being greater than the taper angle of each said tapered end of each said support.

6. A force measuring transducer as claimed in claim 4, including a spring for coupling said end of at least one of said supports to said casing, the force of said spring being directed along said support, said ends of said other supports being rigidly attached to said casing.

* * * * *